United States Patent
Bhaya et al.

(10) Patent No.: US 10,423,621 B2
(45) Date of Patent: *Sep. 24, 2019

(54) DATA STRUCTURE POOLING OF VOICE ACTIVATED DATA PACKETS

(71) Applicant: Google LLC, Mountain View, CA (US)

(72) Inventors: Gaurav Bhaya, Sunnyvale, CA (US); Robert Stets, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/018,750

(22) Filed: Jun. 26, 2018

(65) Prior Publication Data

US 2018/0308493 A1  Oct. 25, 2018

Related U.S. Application Data

(63) Continuation of application No. 15/395,737, filed on Dec. 30, 2016, now Pat. No. 10,013,986.

(51) Int. Cl.
*G10L 15/00* (2013.01)
*G06F 16/2455* (2019.01)
(Continued)

(52) U.S. Cl.
CPC ...... *G06F 16/2455* (2019.01); *G06F 16/2428* (2019.01); *G10L 15/1822* (2013.01);
(Continued)

(58) Field of Classification Search
CPC ..... G10L 15/02; G10L 15/005; G10L 15/222; G10L 15/063; G10L 2015/223;
(Continued)

(56) References Cited

U.S. PATENT DOCUMENTS

| 5,749,069 A | 5/1998 | Komori et al. |
| 6,275,806 B1 | 8/2001 | Pertrushin |

(Continued)

FOREIGN PATENT DOCUMENTS

| GB | 2 328 530 | 2/1999 |
| JP | 2004-192264 A | 7/2004 |

(Continued)

OTHER PUBLICATIONS

"All the young dues: the gulf between traditional media and young men continue to widen as the on-demand world caters to the demographics need", Media Week, Sep. 5, 2005, vol. 15, No. 31, p. 16.

(Continued)

*Primary Examiner* — Edgar X Guerra-Erazo
(74) *Attorney, Agent, or Firm* — Foley & Lardner LLP; James De Vellis

(57) ABSTRACT

Systems and methods of voice activated thread management in a voice activated data packet based environment are provided. A natural language processor ("NLP") component can receive and parse data packets comprising a first input audio signal to identify a first request and a first trigger keyword. A direct action application programming interface ("API") can generate a first action data structure with a parameter defining a first action. The NLP component can receive and parse a second input audio signal to identify a second request and a second trigger keyword, and can generate a second action data structure with a parameter defining a second action. A pooling component can generate the first and second action data structures into a pooled data structure, and can transmit the pooled data structure to a service provider computing device to cause it device to perform an operation defined by the pooled data structure.

20 Claims, 5 Drawing Sheets

(51) Int. Cl.
*G10L 15/18* (2013.01)
*G10L 15/30* (2013.01)
*G10L 15/22* (2006.01)
*G06F 16/242* (2019.01)
*G10L 15/08* (2006.01)

(52) U.S. Cl.
CPC .............. *G10L 15/22* (2013.01); *G10L 15/30* (2013.01); *G10L 2015/088* (2013.01)

(58) Field of Classification Search
CPC ........... G10L 2015/265; G10L 2015/30; G10L 2015/32; G10L 17/22; G10L 25/51; G10L 25/54
See application file for complete search history.

(56) References Cited

U.S. PATENT DOCUMENTS

| | | |
|---|---|---|
| 6,298,218 B1 | 10/2001 | Lowe et al. |
| 6,505,161 B1 | 1/2003 | Brems |
| 6,684,249 B1 | 1/2004 | Frerichs et al. |
| 6,751,475 B1 | 6/2004 | Holmes et al. |
| 6,857,007 B1 | 2/2005 | Bloomfield |
| 6,928,218 B2 | 8/2005 | Nakata et al. |
| 7,013,149 B2 | 3/2006 | Vetro et al. |
| 7,024,211 B1 | 4/2006 | Martin |
| 7,136,658 B2 | 11/2006 | Cole et al. |
| 7,441,203 B2 | 10/2008 | Othmer et al. |
| 7,451,041 B2 | 11/2008 | Laumeyer et al. |
| 7,610,151 B2 | 10/2009 | Letchner et al. |
| 7,617,042 B2 | 11/2009 | Horvitz et al. |
| 7,698,236 B2 | 4/2010 | Cox et al. |
| 7,789,800 B1 | 9/2010 | Watterson et al. |
| 7,824,310 B1 | 11/2010 | Shea |
| 7,853,255 B2 | 12/2010 | Karaoguz et al. |
| 7,861,260 B2 | 12/2010 | Shkedi |
| 7,983,690 B2 | 7/2011 | Oesterling et al. |
| 8,050,690 B2 | 11/2011 | Neeraj |
| 8,065,185 B2 | 11/2011 | Foladare et al. |
| 8,073,460 B1 | 12/2011 | Scofield et al. |
| 8,078,149 B2 | 12/2011 | Miyazawa |
| 8,195,133 B2 | 6/2012 | Ramer et al. |
| 8,260,665 B2 | 9/2012 | Foladare et al. |
| 8,386,386 B1 | 2/2013 | Zhu |
| 8,453,058 B1 | 5/2013 | Coccaro et al. |
| 8,793,066 B2 | 7/2014 | Panabaker et al. |
| 8,903,716 B2 | 12/2014 | Chen et al. |
| 9,092,808 B2 | 7/2015 | Angell et al. |
| 9,275,637 B1 | 3/2016 | Salvador et al. |
| 9,318,107 B1 | 4/2016 | Sharifi |
| 9,424,841 B2 | 8/2016 | Foerster et al. |
| 9,542,941 B1 | 1/2017 | Weksler et al. |
| 9,653,075 B1 | 5/2017 | Chen et al. |
| 2002/0046084 A1 | 4/2002 | Steele et al. |
| 2002/0087335 A1 | 7/2002 | Meyers et al. |
| 2002/0087401 A1 | 7/2002 | Leapman et al. |
| 2002/0097193 A1 | 7/2002 | Powers |
| 2002/0102993 A1 | 8/2002 | Hendrey et al. |
| 2002/0147638 A1 | 10/2002 | Banerjee et al. |
| 2003/0018479 A1 | 1/2003 | Oh et al. |
| 2003/0154072 A1 | 8/2003 | Young et al. |
| 2004/0019654 A1 | 1/2004 | Powers et al. |
| 2004/0192351 A1 | 9/2004 | Duncan |
| 2005/0038698 A1 | 2/2005 | Lukose et al. |
| 2005/0222908 A1 | 10/2005 | Altberg et al. |
| 2005/0245271 A1 | 11/2005 | Vesuna |
| 2006/0176289 A1 | 8/2006 | Horn |
| 2006/0212350 A1 | 9/2006 | Ellis et al. |
| 2006/0224447 A1 | 10/2006 | Koningstein |
| 2006/0242012 A1 | 10/2006 | Agarwal et al. |
| 2006/0247913 A1 | 11/2006 | Huerta et al. |
| 2006/0277308 A1 | 12/2006 | Morse et al. |
| 2006/0286989 A1 | 12/2006 | Illion |
| 2006/0287915 A1 | 12/2006 | Boulet et al. |
| 2007/0022032 A1 | 1/2007 | Anderson et al. |
| 2007/0072553 A1 | 3/2007 | Barbera |
| 2007/0072591 A1 | 3/2007 | McGary et al. |
| 2007/0073585 A1 | 3/2007 | Apple et al. |
| 2007/0097975 A1 | 5/2007 | Rakers et al. |
| 2007/0113725 A1 | 5/2007 | Oliver et al. |
| 2007/0127688 A1 | 6/2007 | Doulton |
| 2007/0179359 A1 | 8/2007 | Goodwin |
| 2007/0244750 A1 | 10/2007 | Grannan et al. |
| 2007/0282612 A1 | 12/2007 | Kaneko et al. |
| 2008/0004950 A1 | 1/2008 | Huang et al. |
| 2008/0004951 A1 | 1/2008 | Huang et al. |
| 2008/0004953 A1 | 1/2008 | Ma et al. |
| 2008/0027799 A1 | 1/2008 | Hao et al. |
| 2008/0071536 A1 | 3/2008 | Nagashima |
| 2008/0081640 A1 | 4/2008 | Tran et al. |
| 2008/0086360 A1 | 4/2008 | Kanapur et al. |
| 2008/0091518 A1 | 4/2008 | Eisenson et al. |
| 2008/0097836 A1 | 4/2008 | Silanto et al. |
| 2008/0103781 A1 | 5/2008 | Wasson et al. |
| 2008/0109309 A1 | 5/2008 | Landau et al. |
| 2008/0109317 A1 | 5/2008 | Singh |
| 2008/0133336 A1 | 6/2008 | Altman et al. |
| 2008/0139181 A1 | 6/2008 | Lokshin |
| 2008/0139306 A1 | 6/2008 | Lutnick et al. |
| 2008/0153513 A1 | 6/2008 | Flake et al. |
| 2008/0167106 A1 | 7/2008 | Lutnick et al. |
| 2008/0182590 A1 | 7/2008 | Ruckart et al. |
| 2008/0189215 A1 | 8/2008 | Travez et al. |
| 2008/0195664 A1 | 8/2008 | Maharajh et al. |
| 2008/0201225 A1 | 8/2008 | Maharajh et al. |
| 2008/0201731 A1 | 8/2008 | Howcroft |
| 2008/0227467 A1 | 9/2008 | Barnes et al. |
| 2008/0242231 A1 | 10/2008 | Gray |
| 2008/0242271 A1 | 10/2008 | Schmidt et al. |
| 2008/0248815 A1 | 10/2008 | Busch |
| 2008/0300109 A1 | 12/2008 | Karkanias et al. |
| 2008/0313039 A1 | 12/2008 | Altberg et al. |
| 2008/0319652 A1 | 12/2008 | Moshfeghi |
| 2009/0005973 A1 | 1/2009 | Salo et al. |
| 2009/0030774 A1 | 1/2009 | Rothschild et al. |
| 2009/0043657 A1 | 2/2009 | Swift et al. |
| 2009/0048914 A1 | 2/2009 | Shenfield et al. |
| 2009/0055254 A1 | 2/2009 | Madhavan et al. |
| 2009/0076906 A1 | 3/2009 | Kansal et al. |
| 2009/0089166 A1 | 4/2009 | Happonen |
| 2009/0128335 A1 | 5/2009 | Leung |
| 2009/0132311 A1 | 5/2009 | Klinger et al. |
| 2009/0138563 A1 | 5/2009 | Zhu et al. |
| 2009/0150489 A1 | 6/2009 | Davis et al. |
| 2009/0164299 A1 | 6/2009 | Gupta et al. |
| 2009/0164300 A1 | 6/2009 | Gupta et al. |
| 2009/0197616 A1 | 8/2009 | Lewis et al. |
| 2009/0198538 A1 | 8/2009 | Gupta et al. |
| 2009/0203387 A1 | 8/2009 | Wold et al. |
| 2009/0210491 A1 | 8/2009 | Thakkar et al. |
| 2009/0282008 A1 | 11/2009 | Harrington et al. |
| 2010/0299615 A1 | 11/2010 | Miluzzo et al. |
| 2010/0312646 A1 | 12/2010 | Gupta et al. |
| 2012/0265528 A1 | 10/2012 | Gruber et al. |
| 2012/0302259 A1 | 11/2012 | Busch |
| 2012/0330754 A1 | 12/2012 | Foladare et al. |
| 2013/0073400 A1 | 3/2013 | Heath |
| 2013/0117022 A1 | 5/2013 | Chen et al. |
| 2013/0275164 A1 | 10/2013 | Gruber et al. |
| 2013/0304758 A1 | 11/2013 | Gruber et al. |
| 2013/0325449 A1 | 12/2013 | Levien et al. |
| 2014/0222436 A1 | 8/2014 | Binder et al. |
| 2014/0229184 A1 | 8/2014 | Shires |
| 2014/0244263 A1 | 8/2014 | Pontual et al. |
| 2014/0337028 A1 | 11/2014 | Wang et al. |
| 2014/0350938 A1 | 11/2014 | Schroeter |
| 2015/0081288 A1 | 3/2015 | Kim |
| 2015/0106085 A1 | 4/2015 | Lindahl |
| 2015/0142447 A1 | 5/2015 | Kennewick et al. |
| 2015/0221305 A1 | 8/2015 | Sharifi |
| 2016/0055225 A1* | 2/2016 | Xu .................. G06F 16/27 707/624 |
| 2016/0180846 A1 | 6/2016 | Lee |
| 2016/0217790 A1 | 7/2016 | Sharifi |

(56) References Cited

U.S. PATENT DOCUMENTS

| | | |
|---|---|---|
| 2017/0069317 A1 | 3/2017 | Kwon |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0147585 A1 | 5/2017 | Kleindienst et al. |
| 2017/0358301 A1 | 12/2017 | Raitio et al. |
| 2017/0364702 A1* | 12/2017 | Goldfarb ............... H04L 41/12 |

FOREIGN PATENT DOCUMENTS

| | | |
|---|---|---|
| KR | 10-2009-0000442 | 10/2013 |
| WO | WO-2007/075238 A1 | 7/2007 |

OTHER PUBLICATIONS

"The Mobile Media Review: Mo' Betta Mags, Mo' Betta Ads, Mo' Betta Search, Mo' Betta Music," Wireless Business Forecast, Potomac, Nov. 30, 2007, vol. 3, Issue 23.
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Anonymous, "Trimble: Trimble Offers Free Geocaching Application for GPS-Enabled Nokia Mobile Phones," Internet Weekly News, Atlanta, GA, Feb. 18, 2008, p. 5.
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Business Editors/High Tech Writers, "MatchLogic Introduces Intelligent Targeting Service", Business Wire, New York, Oct. 6, 1998, p. 1.
Chen, Lulu Yilun, "Alibaba Challenges Google, Amazon With New Echo-Like Device", Bloomberg Technology, Jul. 5, 2017 (3 pages).
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gray, Audrey, "Connecting to New Sales", Dealerscope, Philadelphia, PA, Feb. 2008, vol. 50, Issue 2, p. 76.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Ser. No. PCT/US2017/049774 dated Dec. 1, 2017.
Jens Henrik Hosbond et al., "Micro mobility marketing: Two cases on location-based supermarket shopping trolleys," Journal of Targeting, Measurement and Analysis for Marketing, suppl. Special Issue: Mobile Marketing, 16, 1, Dec. 2007, pp. 68-77.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Laura Holson, "In CBS Test, Mobile Ads Find Users", New York Times (1923-Current File); Feb. 6, 2008, p. C1.
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Morrisey, Brian, "Marketers Enlist Mobile Phones as Utility Vehicles", Adweek, Nov. 26, 2007, 48,43, p. 10.
Nieva, Richard, "Google Home and eBay can tell you how much that's worth", cnet, Mar. 8, 2017 (3 pages).
Notice of Allowance on U.S. Appl. No. 15/395,707 dated Feb. 20, 2018.
Novet, et al., "Amazon is getting ready to bring Alexa to work", CNBC, Nov. 29, 2017, 4 pages.
O'Loughlin, Sandra, "Asics America Effort Hits the Ground Running", Brandweek, New York, Jan. 16, 2006, vol. 47, Issue 3, p. 6.

(56) References Cited

OTHER PUBLICATIONS

Omer Rashid et al., "Providing location based information/advertising for existing mobile phone users," Pers Ubiquit Comput (2008), 12:3-10, published online, Nov. 2006.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Petrecca, Laura, "Cyber winners had strong connection; Nike, Unilever, Diesel take honors," USA Today, Mclean, VA, Jun. 21, 2007, p. B.5.
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
U.S. Appl. No. 60/910,662, filed Apr. 8, 2007, pp. 1-35.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
U.S. Notice of Allowance on U.S. Appl. No. 12/035,202 dated Jul. 11, 2011.
U.S. Notice of Allowance on U.S. Appl. No. 13/278,338 dated May 24, 2012.
U.S. Notice of Allowance on U.S. Appl. No. 13/600,581 dated Feb. 28, 2014.
U.S. Office Action for U.S. Appl. No. 14/309,337 dated Mar. 3, 2015.
U.S. Office Action on U.S. Appl. No. 12/035,202 dated Mar. 1, 2011.
U.S. Office Action on U.S. Appl. No. 12/035,202 dated Oct. 4, 2010.
U.S. Office Action on U.S. Appl. No. 13/278,338 dated Dec. 7, 2011.
U.S. Office Action on U.S. Appl. No. 13/600,581 dated Mar. 29, 2013.
U.S. Office Action on U.S. Appl. No. 13/600,581 dated Oct. 1, 2013.
U.S. Office Action on U.S. Appl. No. 13/600,581 dated Oct. 24, 2012.
U.S. Office Action on U.S. Appl. No. 14/309,337 dated Oct. 16, 2015.
U.S. Office Action on U.S. Appl. No. 14/309,337 dated Aug. 27, 2014.
U.S. Office Action on U.S. Appl. No. 14/309,337 dated Apr. 8, 2016.
U.S. Office Action on U.S. Appl. No. 14/549,140 dated May 2, 2016.
U.S. Office Action on U.S. Appl. No. 14/831,152 dated Apr. 18, 2017.
U.S. Office Action on U.S. Appl. No. 14/831,152 dated Oct. 20, 2016.
U.S. Office Action on U.S. Appl. No. 15/395,707 dated Oct. 19, 2017.
Willens, Max, "For publishers, Amazon Alexa holds promise but not much money (yet)", Digiday, Jul. 6, 2017 (6 pages).
Office Action for KR 10-2017-7031390 dated Jan. 17, 2019.
Perez, "Amazon Alexa can now order an Uber from your Echo Speaker or Fire TV," TechCrunch, 2016. Accessed from https://techcrunch.com/2016/02/05/amazon-alexa-can-now-order-an-uber-from-your-echo-speaker-or-fire-tv/.
Japanese Non Final Office Action for application No. 2017-556893 dated Mar. 4, 2019.

\* cited by examiner

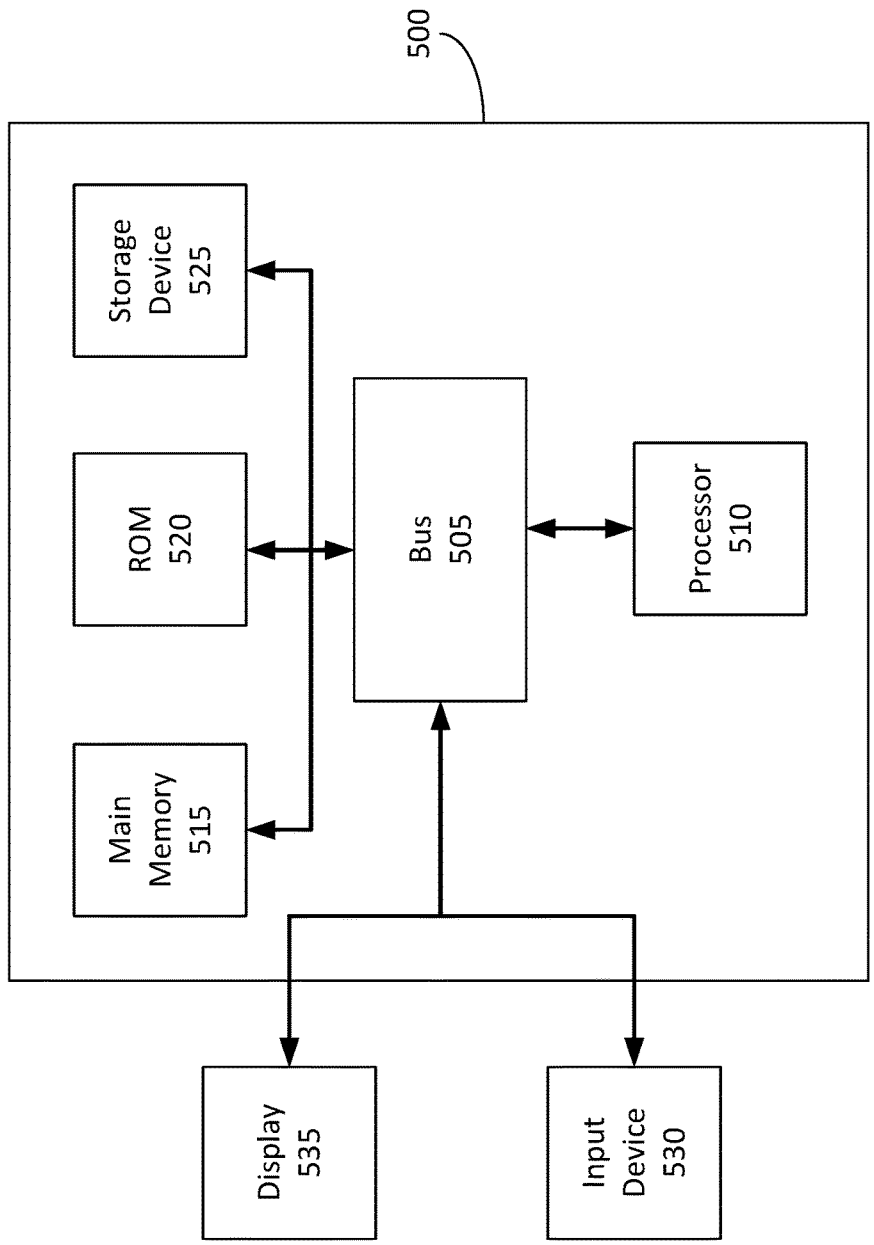

DATA STRUCTURE POOLING OF VOICE ACTIVATED DATA PACKETS

CROSS-REFERENCES TO RELATED APPLICATIONS

This application claims the benefit of priority under 35 U.S.C. § 120 as a continuation of U.S. patent application Ser. No. 15/395,707, titled "Data Structure Pooling of Voice Activated Data Packets" and filed Dec. 30, 2016, which is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system to manage voice activated threads in a voice activated data packet based computer network environment. A natural language processor component executed by a data processing system can receive, via an interface of the data processing system, data packets comprising a first input audio signal detected by a sensor of a first client computing device. The natural language processor component can parse the first input audio signal to identify a first request and a first trigger keyword corresponding to the first request. A direct action application programming interface ("API") of the data processing system can generate, based on the first trigger keyword and in response to the first request, a first action data structure with a parameter defining a first action. The natural language processor component can receive, via the interface of the data processing system, data packets comprising a second input audio signal detected by a sensor of a second client computing device, and can parse the second input audio signal to identify a second request and a second trigger keyword corresponding to the second request. The direct action API can generate, based on the second trigger keyword and in response to the second request, a second action data structure with a parameter defining a second action. A pooling component of the data processing system can determine, based on a heuristic technique applied to the parameter of the first action data structure and the parameter of the second action data structure, a pooling parameter that indicates a level of overlap between the first action data structure and the second action data structure. The pooling component can combine, based on the pooling parameter, the first action data structure with the second action data structure into a pooled data structure. The pooling component can transmit, via a computer network, the pooled data structure to a service provider computing device to cause the service provider computing device to perform an operation defined by the pooled data structure and corresponding to the first action and the second action.

At least one aspect is directed to a method to manage voice activated threads in a voice activated data packet based computer network environment. The method can include receiving, by a natural language processor component executed by a data processing system, via an interface of the data processing system, data packets comprising a first input audio signal detected by a sensor of a first client computing device. The method can include parsing, by the natural language processor component, the first input audio signal to identify a first request and a first trigger keyword corresponding to the first request. The method can include generating, by a direct action application programming interface ("API") of the data processing system, based on the first trigger keyword and in response to the first request, a first action data structure with a parameter defining a first action. The method can include receiving, by the natural language processor component, via the interface of the data processing system, data packets comprising a second input audio signal detected by a sensor of a second client computing device, and parsing, by the natural language processor component, the second input audio signal to identify a second request and a second trigger keyword corresponding to the second request. The method can include generating, by the direct action API, based on the second trigger keyword and in response to the second request, a second action data structure with a parameter defining a second action. The method can include determining, by a pooling component of the data processing system, based on a heuristic technique applied to the parameter of the first action data structure and the parameter of the second action data structure, a pooling parameter that indicates a level of overlap between the first action data structure and the second action data structure. The method can include combining, based on the pooling parameter, the first action data structure with the second action data structure into a pooled data structure. The method can include transmitting, via a computer network, the pooled data structure to a service provider computing device to cause the service provider computing device to perform an operation defined by the pooled data structure and corresponding to the first action and the second action.

At least one aspect is directed to a computer readable storage medium storing instructions that when executed by one or more data processors, cause the one or more data processors to perform operations to manage voice activated threads in a voice activated data packet based computer network environment. The operations can include receiving, by a natural language processor component executed by a data processing system, via an interface of the data processing system, data packets comprising a first input audio signal detected by a sensor of a first client computing device. The operations can include parsing, by the natural language processor component, the first input audio signal to identify a first request and a first trigger keyword corresponding to the first request. The operations can include generating, by a direct action application programming interface ("API") of the data processing system, based on the first trigger keyword and in response to the first request, a first action data structure with a parameter defining a first action. The operations can include receiving, by the natural language processor component, via the interface of the data processing system, data packets comprising a second input audio signal detected by a sensor of a second client computing device, and parsing, by the natural language processor component, the second input audio signal to identify a second request and a second trigger keyword corresponding to the second request. The operations can include generating, by the direct action API, based on the second trigger keyword and in response to the second request, a second action data structure with a parameter defining a second action. The operations can include determining, by a pooling component of the data processing system, based on a heuristic technique applied to the parameter of the first action data structure and the parameter of the second action data structure, a pooling parameter that indicates a level of overlap between the first action data structure and the second action data structure. The operations can include combining, based on the pooling parameter, the first action data structure with the second action data structure into a pooled data structure. The operations can include transmitting, via a computer network, the pooled data structure to a service provider computing device to cause the service provider computing device to perform an operation defined by the pooled data structure and corresponding to the first action and the second action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a block diagram illustrating a general architecture for a computer system that may be employed to implement elements of the systems and methods described and illustrated herein.

DETAILED DESCRIPTION

Figure 1:
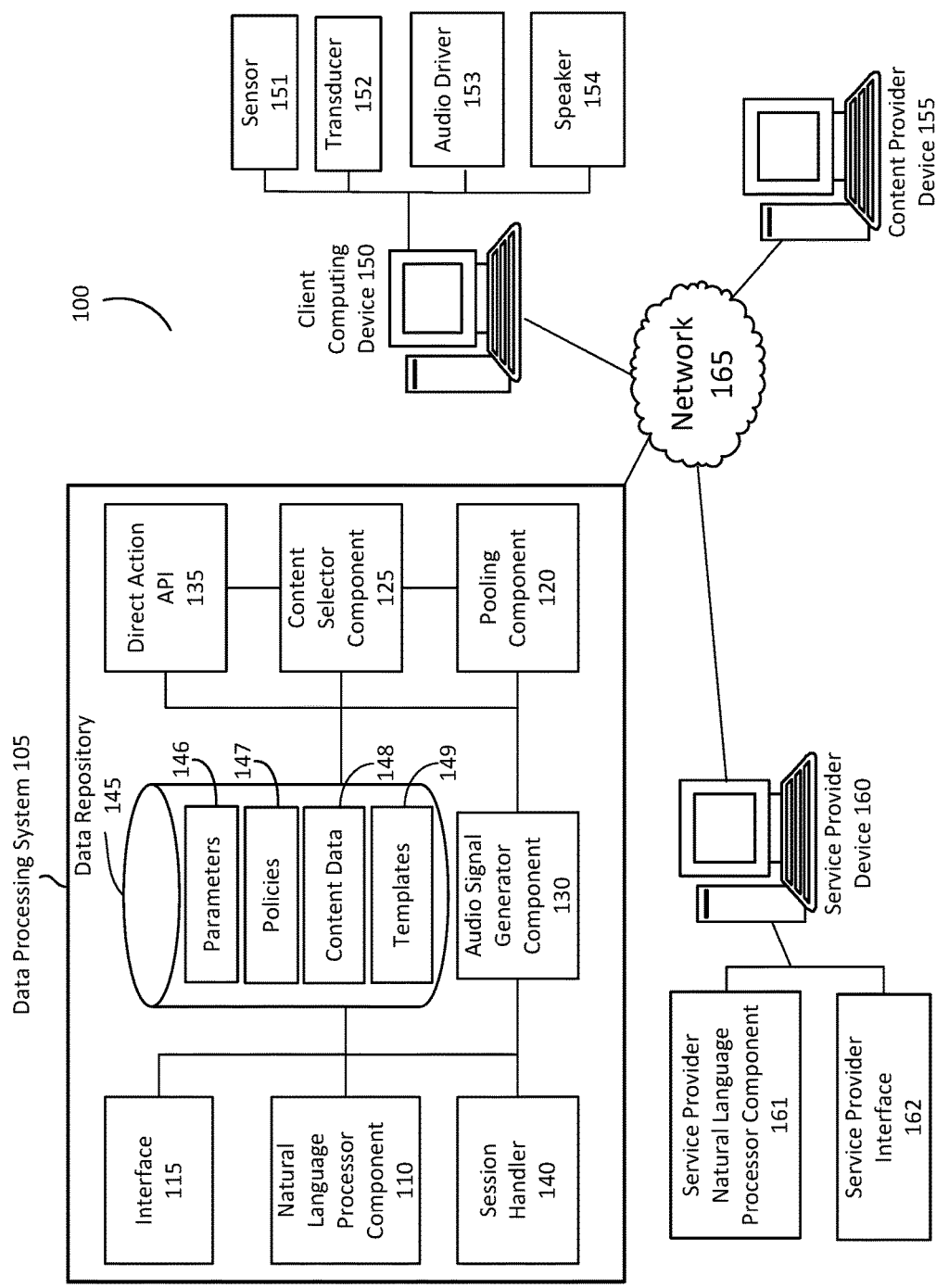
FIG. 1 depicts a system to manage voice activated threads in a voice activated data packet based computer network environment.

Following below are more detailed descriptions of various concepts related to, and implementations of, methods, apparatuses, and systems to manage voice activated threads in a voice activated data packet (or other protocol) based computer network environment. The various concepts introduced above and discussed in greater detail below may be implemented in any of numerous ways.

Systems and methods of the present disclosure relate generally to a data processing system that manages redundant or overlapping voice activated threads in a voice activated computer network environment. The voice activated threads can indicate one or more actions represented by at least one action data structure. The data processing system can improve the efficiency and effectiveness of data packet transmission over one or more computer networks by, for example, pooling (e.g., merging, aggregating, or batching) action data structures due to overlapping subject matter or other overlapping or common parameters. Data packets or other protocol based signals corresponding to the pooled action data structures can be processed by a direct action application programming interface (API) of the data processing system to provide responsive data (e.g., audio output) or to accomplish a task or action related to the pooled action data structure. The data packets or other protocol based signals corresponding to the pooled action data structures can be routed through a computer network from the data processing system to at least one service provider computing device to accomplish a task or action related to the pooled action data structure.

By merging or pooling multiple action data structures into a single or pooled action data structure, and batch processing the pooled action data structure, the data processing system can reduce processor utilization, power consumption, bandwidth utilization, and memory usage relative to individual or non-pooled evaluation of the individual action data structures. For example, providing the pooled action data structure to the service provider computing device via a computer network can use less bandwidth than providing multiple individual action data structures to the service provider computing device. The pooled action data structure can eliminate redundancies present in multiple individual action data structures, resulting in decreased processor and power utilization by the data processing system when determining actions responsive to the pooled action data structure, relative to determining actions responsive to each individual or un-pooled action data structure.

By at least partially bypassing individual action data structure processing and instead generating pooled action data structures, the data processing system can reduce, delay, or eliminate data processing associated with individual action data structure operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query, which can also be referred to as an input audio signal. From the input audio signal the data processing system can identify a request and a trigger keyword corresponding to the request. Based on the trigger keyword or the request, the data processing system can determine a first action data structure that includes at least one parameter defining a first action. The data processing system can also receive a second input audio signal, and from at least one request or trigger keyword of the second input audio signal, can identify from the second input audio signal a second action data structure that includes at least one parameter defining the second action. The data processing system can determine from the parameters of the first and second action data structures, at least one pooling parameter. The pooling parameter can indicate a level of overlap (e.g., subject matter commonality) between the first action data structure and the second action data structure.

Based on the pooling parameter, the data processing system can combine the first action data structure and the second action data structure to generate a pooled data structure. The pooled data structure can indicate at least one parameter of actions (e.g., the first action or the second action) common to client computing devices that are the sources of the input audio signals. The data processing system can process the pooled data structure to generate output signals (e.g., an audio content item for rendering at one or more client computing devices), or to accomplish tasks related to the first and second actions. The data processing system can also transmit the pooled data structure to at least one service provider computing device, to cause the service provider to perform operations defined by the pooled data structure. These operations can correspond to the first or second actions, and can accomplish tasks related to the first or second actions. Pooling the action data structures causes the operations or tasks that correspond to the first or second actions to be performed or accomplished by the data processing system (or by the service provider computing device) with less data processing and less electrical power usage than would be the case without the pooling operation.

FIG. 1 depicts an example system 100 to manage or otherwise optimize processing of voice activated threads in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from audio input signals, requests and trigger keywords associated with the request. Based on the requests and trigger keywords the data processing system 105 can generate action data structures, each having respective parameters that indicate or define respective actions. The data processing system 105 can determine, from the respective parameters, a level of commonality or overlap between the action data structures. Responsive to a determination by the data processing system of a sufficient level of overlap, the data processing system 105 can pool (or otherwise combine or merge) multiple different action data structures into a pooled action data structure.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one pooling component 120, at least one content selector component 125, at least one audio signal generator component 130, at least one direct action application programming interface (API) 135, at least one session handler component 140, and at least one data repository 145. The NLP component 110, interface 115, pooling component 120, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 150, the content provider computing device 155, or the service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a voice activated assistant system, content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit or render the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The computer generated voice can include recordings from a real person or computer generated language.

The content provider computing device 155 can provide audio based content items for display by the client computing device 150 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 105 where they can be stored in the data repository 145. The data processing system 105 can select the audio content items and provide (or instruct the content provider computing device 155 to provide) the audio content items to the client computing device 150. The audio based content items can be exclusively audio or can be combined with text, image, or video data.

The data processing system 105 can also perform conversions, e.g., accomplish tasks responsive to the input audio signal. For example, via the direct action API 135, the data processing system 105 can order a taxi responsive to a request to do so received from the client computing device 150. The data processing system 105 can also perform a conversion by providing data (e.g., a pooled data structure) to the service provider computing device 160 so that the service provider computing device can accomplish a task by, for example, ordering a taxi responsive to a request to do so received by the data processing system 105 from the client computing device 150. The data processing system 105 can also obtain conversion information, e.g., indicating that a task or action was accomplished, from the client computing devices 150, from the content provider computing devices 155, or from the service provider computing devices 160.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages to the direct action API 135 of the data processing system 105. The service provider computing device 160 and the content provider computing device 155 can be associated with the same entity. For example, the content provider computing device 155 can create, store, or make available content items for a car sharing service, and the service provider computing device 160 can establish a session with the client computing device 150 to arrange for a delivery of a taxi or car of the car share service to pick up the end user of the client computing device 150. The data processing system 105, via the direct action API 135, the NLP component 110 or other components can also establish the session with the client computing device, including or bypassing the service provider computing device 160, to arrange for example for a delivery of a taxi or car of the car share service.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include content items for audio output or associated metadata, as well as input audio messages that can be part of one or more communication sessions with the client computing device 150.

The system 100 can optimize or manage processing of voice activated threads (e.g., that indicate one or more actions) in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of audio output for display from the client computing device 150 to accomplish tasks related to this input audio signal. The tasks can include, for example, communicating with the service provider computing device 160 or other third party computing devices to make dinner reservations or purchase movie tickets. For example, an end user can enter an input audio signal into the client computing device 150 of: "OK, I would like to go to go dinner and then a movie tonight."

The data processing system 105 can include an application, script or program installed at the client computing device 150, such as an app of a voice activated assistant system to communicate input audio signals to the interface 115 of the data processing system 105 and to drive components of the client computing device to render output audio signals. The data processing system 105 can receive data packets or other signal that includes or identifies an audio input signal. For example, the data processing system 105 can execute or run the NLP component 110 to receive the audio input signal.

The audio input signal can be detected by the sensor 151 (e.g., a microphone) of the client computing device. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary or sub-action to at least one other action that is indicated by the request.

The NLP component 110 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The direct action API 135 can execute programs or scripts, for example from the NLP component 110, the pooling component 120, or the content selector component 125 to identify content items for one or more of these actions. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi, for example. The direct action API 135 can determine necessary parameters and can package the information into an action data structure, which can then be sent to another component such as the content selector component 125 or to the service provider computing device 160 to be fulfilled. The direct action API 135 can execute on, or include, hardware of the data processing system 105 such as one or more processors of one or more servers in one or more data centers.

The direct action API 135 of the data processing system 105 can generate, based on the request or the trigger keyword, data structures for the actions of the thread. The action data structures can be generated responsive to the request. The action data structure can be included in the messages that are transmitted to or received by the service provider computing device 160, e.g. as part of or associated with pooled data structures. Based on the request parsed by the NLP component 110, the direct action API 135 can determine to which of a plurality of service provider computing devices 160 the message should be sent. For example, if an input audio signal includes "order a taxi," the NLP component 110 can identify the trigger word "order" and the request for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location and a destination location. The direct action API 135 can retrieve a template 149 from the repository 145 to determine which fields to include in the action data structure. The direct action API 135 can retrieve content from the repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

The NLP component 110 can obtain the input audio signal as data packet or other protocol based transmissions from the client computing device 150. For example, the input audio signal could be a voice input into the sensor 152 (e.g., a microphone) of "OK, take me home". From this input audio signal the NLP component 110 can identify at least one request or at least one trigger keyword. The request can indicate subject matter of the input audio signal, e.g., travel. The trigger keyword can indicate an action, e.g., "take" or "home" can indicate a need for a car share service to a destination associated with a home destination of the client computing device 150 that originated the input audio signal.

The direct action API 135 can obtain the requests or trigger keywords that correspond to the input audio signal, and from this information can generate an action data structure. The action data structure can include information used, for example, to communicate with the service provider computing device to reserve a car from a car share service to take the end user (who originated the input audio signal into the client computing device) to a destination. The action data structure can, with end user consent, include parameters such as information identifying the location of the client computing device 150 to arrange the pickup by the car share service, as well as information identifying the destination location. The parameters can be stored in and retrieved from the data repository (e.g., parameters 146) by data processing system 105 components. The direct action API 135 can also generate the action data structure to include or indicate parameters such as account information of an account associated with the car share service. For example, the direct action API 135 can obtain, with end user consent, this account information (or other parameter) from an app or program for the car share service that is installed on the client computing device 150. The parameters can indicate or define actions associated with the action data structures. The direct action API 135 can be installed on the data processing system 105, remote from the client computing device 150. The direct action API 135 can perform a direct conversion, e.g., place an order with the service provider computing device 160 for the car share service trip, or indirectly by providing the action data structure to the service provider computing device 160 for the service provider computing device 160 to process the action data structure in order to complete the car reservation transaction.

The NLP component 110 can obtain multiple input audio signals from the same or different client computing devices 150. For each input audio signal, the NLP component can identify or create corresponding requests or corresponding trigger keywords. The direct action API 135 can generate, based on the respective requests or keywords, action data structures corresponding to the respective input audio signals. For example, the NLP component 110 can receive a first input audio signal indicating the voice input "OK, take me home". In response, the direct action API 135 can generate a first action data structure that can be used to reserve a car from a car share service for the end user associated with the first input audio signal. The NLP component 110 can also receive a second input audio signal indicating, for example, "OK, can I get a taxi please". In response, the direct action API 135 can generate a second action data structure for a car share service for the end user associated with the second input audio signal.

The first and second input audio signal can originate from the same client computing device 150 or from different client computing devices 150, and can be associated with the same or different end users. For example, the NLP component 110 can receive first input audio signal from a first client computing device 150 and can receive a second input audio signal from a second client computing device 150 that can be associated with different end users. From this information, which can include metadata or header information of packet based transmissions, among supplemental information that can be obtained from sources other than the input audio signal, such as from content data 148 of the data repository 145, the direct action API 135 can generate a first data structure for the first input audio signal and a second data structure for the second input audio signal. The first and second data structures can both indicate requests to reserve a car from a car share service. Each action data structure can include parameters that indicate their own origination and destination locations, or can indicate different accounts that different end users have with the car share service (or other parameters). The action data structure can also include one or more parameters that indicate that a client computing device 150 (or associated end user) does not have an account with the car share service or other entity.

Based for example on parameters of multiple action data structures, the pooling component 120 can identify overlap or similarities between two or more different action data structures that were generated from different input audio signals. For example, one or more processors of the data processing system 105 can include or execute the pooling component 120, remote from the client computing device 105 and remote from the service provider computing device 160, to identify overlapping or common subject matter of two or more different action data structures. The pooling component 120 can apply a heuristic technique to identify with a threshold degree of certainty of common patterns among the parameters of the different action data structures.

The level of overlap can be or include a similarity metric that indicates a common feature of multiple action data structures. The pooling component 120 can determine a similarity metric indicating the multiple action data structures relate to time data, location data, service provider entity data, subject matter data, or geographic data. For example, the pooling component 120 can determine that multiple action data structures include requests for transport from the same transportation company, or reservations for different times or evenings for the same restaurant, requests to travel to or from a common destination or geographic area, or requests to order one or more products from one entity. The pooling component 120 can identify the similarity metrics or common features as at least one pooling parameter, and based on the pooling parameter the pooling component can create the batched or pooled data structure. The overlap may but need not include at least partially identical code or partially identical action data structures. For example, the pooling component 120 can identify overlap based on requests for services from the same entity, or based on commonality among parameters of the action data structures such as a similar, but not identical, time or location data.

For example, parameters of the first action data structure can indicate a request for a car share service from a pickup location of 'point A' to a destination of 'point B'. Parameters of the second action data structure can indicate a different request for a car share service from a pickup location of 'point C' to a destination of 'point D'. By applying a heuristic or other statistical technique, the data processing system 105 or component thereof (e.g., the pooling component 120) can determine that pickup location 'point C' is located between, or within a threshold distance (e.g., 1 mile) of a route between, 'point A' and 'point B'. The pooling component 120 can also determine that 'point D' is located within a threshold distance (e.g., 5 miles) of destination 'point B'. While the parameters of the different action data structures (e.g., parameters indicating different points A-D, or other information such as different accounts associated with different client computing devices 150, the pooling component 120 can determine that sufficient overlap or commonality exists between the parameters due, for example to route similarities satisfying threshold metrics. The pooling component 120 can also determine that the two action data structures overlap because their respective parameters indicate that they are associated with respective input audio signals that were made within a threshold time period of one another, such as within 1 minute, one hour, of other time period of each other, or because their respective parameters indicate that they are both requesting a good or service from the same entity.

The pooling component 120 can generate, based on the analysis of at least two action data structures, at least one pooling parameter. The pooling parameter can indicate common subject matter, features, entities, or parameters from among two or more action data structures. For example, the pooling parameter can indicate that the requests for car share services indicated by parameters of the first and second action data structures share similar locations, or similar routes between respective sources and destinations. The direct action API 135 (or the service provider computing device 160) can use this information to service the actions associated with or indicated by the action data structures, such as car service rides between respective sources and destinations.

Figure 2:
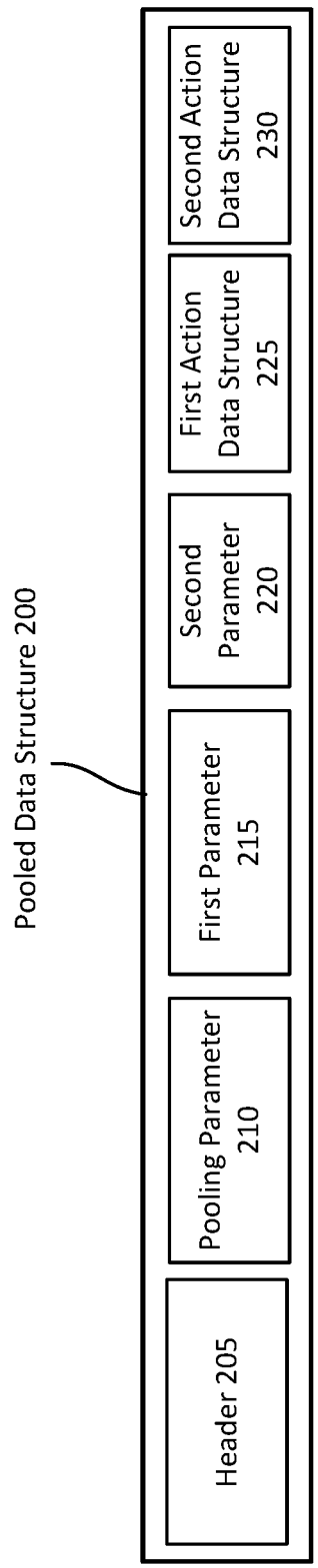
FIG. 2 depicts a functional diagram of a pooled data structure for a voice activated data packet based computer network environment.

Referring to FIG. 1 and FIG. 2, among others, based on the determined level of overlap, the pooling component 120 can create at least one pooled data structure 200. The pooled data structure can include a packet based architecture (or other format) and can include a header 205. The header 205 can include supplemental data identifying the data processing system 105, source or destination address information, governing protocol information, IP addresses, frame synchronization data, size data, resolution data, or metadata associated with action data structures. The payload or body of the pooled data structure 200 can include at least one pooling parameter 210, or other information such as at least one first parameter 215 or at least one second parameters 220. The first parameter 215 can include a parameter of the first action data structure 225, and the second parameters 220 can include a parameter of the second action data structure 230. The first parameter 215, second parameter 220, first action data structure 225 and the second action data structure 230 may but need not be included in the pooled data structure 200. For example, the body of the pooled data structure 200 can include only the pooling parameter 210 (and not include any of the first parameter 215, the second parameter 220, the first action data structure 225 or the second action data structure 230), or the body of the pooled data structure 200 can include the pooling parameter 210 as well as one or more of the first parameter 215, the second parameter 220, the first action data structure 225 or the second action data structure 230. The pooled data structure 200 can include one or more individual packets transmitted separately in sequence or parallel as part of one or more data transmissions between the data processing system 105 and the service provider computing device 160. The pooling parameter, or information in headers 205 can indicate that the separate transmissions or separate data packets are associated with the same batch transmission, e.g., the same overall pooled data structure 200.

Figure 3:
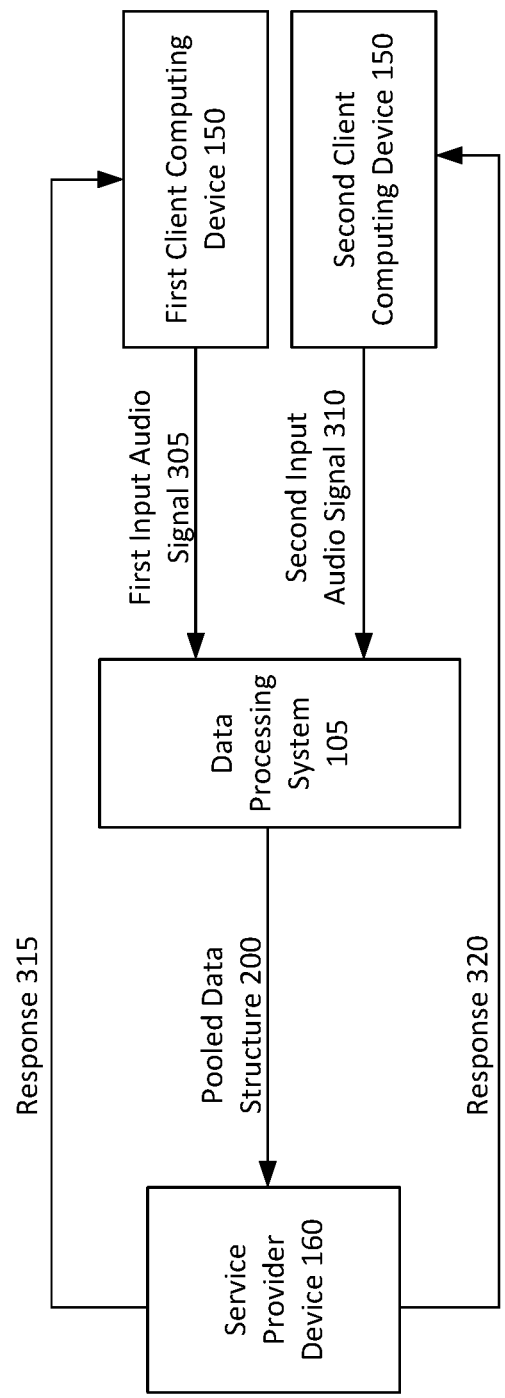
FIG. 3 depicts a functional diagram of action data structure pooling and communication between remote data processing systems and service provider computing devices in a voice activated data packet based computer network environment.

Referring to FIG. 3, among others, the data processing system 105 can receive, from a first client computing device 150, the first input audio signal 305, (e.g., "OK, take me home"). The data processing system 105 can also receive, from a second client computing device 150, the second input audio signal 310, (e.g., "OK, can I get a taxi please"). The data processing system 105 can determine respective parameters that define actions associated with the first input audio signal 305 and the second audio input signal 305. Data processing system 105 components such as the pooling component 120 can apply statistical or heuristic techniques to the parameters associated with the first input audio signal 305 and the second input audio signal 310 to generate at least one pooling parameter indicative of subject matter overlap or commonality between the first input audio signal 305 and the second input audio signal 310. For example, the pooling parameter can indicate that the first input audio signal 305 and the second input audio signal both relate to requests to hire a car from a car share service. The data processing system 105 can batch or pool the action data structures corresponding to the first input audio signal 305 and the second input audio signal 310 to create the batched or pooled data structure 200. The data processing system 105 can transmit or otherwise provide the pooled data structure 200 to the service provider computing device 160 for processing by the service provider computing device 160 to reserve at least one car responsive to the first and second input audio signals 305, 310.

The pooled data structure 200 can include pooling parameters generated from more than two action data structures (or more than two input audio signals). For example, a third audio input signal can cause the data processing system 105 to generate a third action data structure for a third action. The pooling component 120 can identify at least one pooling parameter based on parameters of the third action data structure. Responsive to this determination, the pooling component 120 can modify the pooled data structure 200 to include or indicate an association with the third data structure, or can include a new pooled data structure associated with three (or more) input audio signals.

By consolidating individual action data structures into at least one pooled data structure 200 and transmitting the pooled data structure(s) 200 to the service provider computing device 160, rather than the individual action data structures for each input audio signal 305, 310, the data processing system 105 can reduce the number, size, or frequency of data transmissions via the network 165. This can reduce bandwidth utilization of network transmissions, and can reduce processing power and memory storage requirements of both the data processing system 105 (e.g., data repository 145) and of the service provider computing device 160 that would otherwise be used to process and transmit individual action data structures that may have a level of redundancy or subject matter overlap contained within their data.

The pooled data structure 200 may but need not be a single data structure. For example the pooled data structure can include multiple individual data structures transmitted by the data processing system 105, with or without the pooling parameters, as part of a batched or periodic transmission to one or more service provider computing devices 160 controlled by one entity, such as a car share service provider.

The data processing system 105 and the service provider computing device 160 can correspond to different entities. For example, the data processing system 105 (and components such as the direct action API 135) can be part of a voice based assistant computer system designed to interface with end users of the client computing device 150 to provide audio responses to audio input signals. For example, the audio signal generator component 130 can create an audio response of "There is a taxi 5 minutes away, would you like to order it?" to the audio input signal of "OK, take me home". The session handler component 140 can establish a communication session via the computer network 165 between the data processing system 105 and the client computing device 150 to provide this audio response. The audio response can cause the audio driver 153 of the client computing device 150 to cause the speaker 154 to output acoustic waves to render the audio response to the end user.

Rather than being part of the voice based assistant computer system, the service provider computing device 160 can be a computing device of the car share or taxi service entity. The data processing system 105, and not the service provider computing device 160, processes the input audio signals 305, 310 to generate the pooled data structure 200. Thus, in this example the audio input signals 305, 310 correspond to actions for the service provider computing device 160, e.g., ordering a car from the car share service entity that controls the service provider computing device 160. The data processing system 105 can operate as an intermediary appliance or device that can hook, intercept, or otherwise receive the input audio signals that include requests for action by the service provider computing device 160. The data processing system 105 can batch or consolidate these requests into at least one pooled data structure 200 that is provided to the service provider computing device 160. In this example, rather than receiving input audio signals directly from the client computing devices 150 (e.g., bypassing the data processing system 105), the service provider computing device 160 instead receives a pooled data structure 200 (e.g., a batched transmission of consolidated action data structures) from the intermediary data processing system 105. In this example, requests from the client computing devices 150 for goods or services of the service provider computing device 160 are routed through the data processing system 105, where they are consolidated into a pooled data structure 200 that can be transmitted to the service provider computing device 160.

Responsive to receipt of the pooled data structure 200, the service provider computing device 160 can perform at least one operation defined or indicated by the pooled data structure 200. The operation can correspond to one or more of the respective actions of the action data structures of the first or second input audio signals 305, 310. For example, the operations can include reserving a car from a car share service. The service provider computing device 160 can provide responses to the client computing devices 150. For example, the service provider computing device 160 can provide a first response 315 to the first client computing device 150, and can provide a second response 320 to the second client computing device 150. The first and second responses 315, 320, can bypass the data processing system 105 during transmission from the service provider computing device 160 to the first and second client computing devices 150. The responses 315 can include text, image, or other data messages (including audio) that confirm a conversion action, such as a reservation for a car from a car service. The data processing system 105 can receive an indication of the conversion (or of the responses 315, 320) via the computer network 165 from the service provider computing device 160 or from the client computing devices 150. The data processing system 105 can also receive the responses 315, 320, from the service provider computing device(s) 160.

The service provider entity that corresponds to one or more service provider computing devices 160 can perform multiple operations to accomplish different actions indicated by the pooled data structure 200. For example, the service provider entity can provide grocery deliveries and operate a car share service for human transport. The pooled data structure 200 can indicate both of these actions, which can be accomplished by a single service provider entity that controls one or more service provider computing devices 160. The service provider computing devices 160 can also provide pooling policy data to the data processing system 105. For example the direct action API 135 can receive from the service provider computing devices 160 pooling policy data. The pooling policy data can provide policy guidelines used by the pooling component 120 to generate the pooled data structure 200. The pooling policy data can be stored in the data repository 145 (e.g., as policies 147). The pooling policy data can indicate a format of the pooled data structure, template information (e.g., template 149) or information size data, or about when, how, how frequently, or what information should be included in the pooled data structure. The pooling component 120 can create the pooled data structure 200 in compliance with the pooing policy data.

In some examples, the responses 315, 320 include the same substantive response transmitted separately to both the first and second client computing devices 150. For example, the service provider computing device 160 can consolidate the first and second actions, indicated by respective action data structures in the pooled data structure 200 and can provide a single car the arrives in sequence at pickup locations associated with the first and second client computing devices 150.

The responses 315, 320 need not be pooled. The responses 315, 320 can be different from each other, or customized responses to the first action data structure 225 or the second action data structure 230 (or the first and second parameters 215, 220) of the pooled data structure 200. For example, the service provider computing devices 160 can provide the response 315 with information about a first car share reservation for the first client computing device 150, and can provide the response 320 with information about a different, second car share reservation for the second client computing device 150.

The pooling parameter created by the pooling component 120 and used to generate the pooled data structure 200 can also include temporal, destination, or location data. For example, the pooling parameter can indicate a plurality of action data structures that each correspond to requests for services from a single entity associated with the service provider computing device (e.g., destination information), such as reservation requests for a particular restaurant, orders for a good manufactured by the entity, or car share reservation requests from a car share service. The pooling parameter can also indicate a number of action data structures made within a defined time period, such as within a 2 minute interval each requesting a car service from the same car share entity. The pooling parameter can include location information, such as location information identifying a defined geographical area (e.g., a city block or neighborhood) from which a plurality of people provide input audio signals requesting a service from the same entity associated with the service provider computing device 160. From the pooling parameter, the pooling component 120 can generate the pooled data structure 200 and provide it to the service provider computing device 160, which can perform operations responsive to the pooled data structure, and provide associated responses 315, 320, to the client computing devices 150.

The pooled data structure 200 can include only operations for a single entity, which is a different entity than the entity associated with the data processing system 105. For example, the data processing system 105 (or component such as the pooling component 120) can provide a first pooled data structure to one or more first service provider computing devices 160 controlled by a first entity, and can generate and provide a second pooled data structure to one or more second service provider computing devices 160 that are controlled by a different, second entity unrelated to the first entity. For example, the first pooled data structure can relate to consolidated requests to buy tickets for a local sporting event from a ticket broker company, and the second pooled data structure can relate to requests to make travel reservations for an overseas tropical beach vacation from a travel agent company.

The content selector component 125 can obtain indications of at least one action of the action data structures of the pooled action data structure 200. From the information received by the content selector component 125, e.g., an indication of an action, the content selector component 125 can identify at least one content item. The content item can be responsive or related to the third action. For example, the content item can include an audio message offering services of a car share company, responsive to the third action that indicates a transportation need. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150. The content item can relate to a service provider associated with the action data structure, e.g., an identified car share service, or another service such as a competitor or ancillary service.

The audio signal generator component 130 can generate or otherwise obtain an output signal that includes the content item. For example, the data processing system 105 can execute the audio signal generator component to generate or create an output signal corresponding to the content item. The interface 115 of the data processing system 105 can provide transmit one or more data packets that include the output signal via the computer network 165 to the client computing device 150. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 105 can provide the output signal (e.g., corresponding to the content item or responsive to the input audio signal), from the data repository 145 or from the audio signal generator component 130 to the client computing device 150. The data processing system 105 can also instruct, via data packet transmissions, the content provider computing device 155 or the service provider computing device 160 to provide the output signal to the client computing device 150. The output signal can be obtained, generated, transformed to or transmitted as one or more data packets (or other communications protocol) from the data processing system 105 (or other computing device) to the client computing device 150.

The content selector component 125 can select the content item as part of a real-time content selection process. For example, the content item can be provided to the client computing device 150 as audio output in a conversational manner in direct response to the input audio signal. The real-time content selection process to identify the content item and provide the content item to the client computing device 150 can occur within one minute or less from the time of the input audio signal and be considered real-time.

The output signal that corresponds to the content item, for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the output signal. The acoustic wave can include words of or corresponding to the content item for the third action. The acoustic wave can be output from the client computing device 150, e.g., as an acoustic wave that include the audio output of "Your taxi is confirmed" or "While you are waiting for your taxi, there is a coffee shop around the corner".

The data processing system 105 can prevent or delay transmission of the pooled data structure to the service provider computing device 160. For example, the interface 115 or a script executing via the direct action API 135 or the pooling component 120 can prevent transmission of data packets that include the pooled data structure until a triggering event. The triggering event can include expiration of a pre-determined time period, from less than one minute to a period of days. The triggering event can also be based on available bandwidth, processing, or memory. For example, the service provider computing device 160 can prompt or query the data processing system for the pooled data structure, which the data processing system 105 transmits in response to the prompt.

The data processing system 105 can also delay transmission of the pooled data structure to optimize processing utilization. For example, the data processing system 105 can delay content item transmission until an off-peak or non-peak period of data center usage, which results in more efficient utilization of the data center by reducing peak bandwidth usage, heat output or cooling requirements. The data processing system 105 can also initiate a conversion or other activity associated with the content item, such as ordering a car service, based on data center utilization rates or bandwidth metrics or requirements of the network 165 or of a data center that includes the data processing system 105. This can reduce network traffic, load requirements, and save processing and electrical power.

The data processing system 105 can receive a response to a content item such as an offer for a ride share service that states "would you like a ride home from the movie theater?" The response can include an input audio signal, e.g., "yes please" that was entered into the client computing device 150 by the end user and received by the data processing system 105. Based on this response, the direct action API 135 can communicate with the service provider computing device 160 (that can be associated with the content item, such as a car share company) to order a taxi or ride share vehicle for the location of the movie theater at the time the movie ends. The data processing system 105 can obtain this location or time information as part of the data packet (or other protocol) based data message communication with the client computing device 150, from the data repository 145, or from other sources such as the service provider computing device 160 or the content provider computing device 155. Confirmation of this order (or other conversion) can be provided as an audio communication from the data processing system 105 to the client computing device 150 in the form of an output signal from the data processing system 105 that drives the client computing device 150 to render audio output such as, "great, you will have a car waiting for you at 11 pm outside the theater." The data processing system 105, via the direct action API 135, can communicate with the service provider computing device 160 to confirm the order for the car.

The data processing system 105 can obtain the response (e.g., "yes please") to the content item ("would you like a ride home from the movie theater?") and can route a packet based data message to the service provider NPL component 161 (or other component of the service provider computing device). This packet based data message can cause the service provider computing device 160 to effect a conversion, e.g., to make a car pick up reservation outside the movie theater. The data processing system 105 can obtain a notification of the conversion, e.g., from the service provider computing device 160, the content provider computing device 155, or the client computing device 150.

Based on a response to a content item for a subsequent action in the thread, such as the response "yes please" to the content item "would you like a ride home from the movie theater", or based upon the action data structures including the pooled data structure that can directly indicate a request for a good or service, the data processing system 105 can initiate a conversion or action. For example, processors of the data processing system 105 can invoke the direct action API 135 to execute scripts that order a car from a car share service. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation. The direct action API 135 can initiate the conversion or activity to accomplish an action associated with the pooled data structure (e.g., an action defined by one or more parameters of an action data structure indicated by the pooled data structure)

Figure 4:
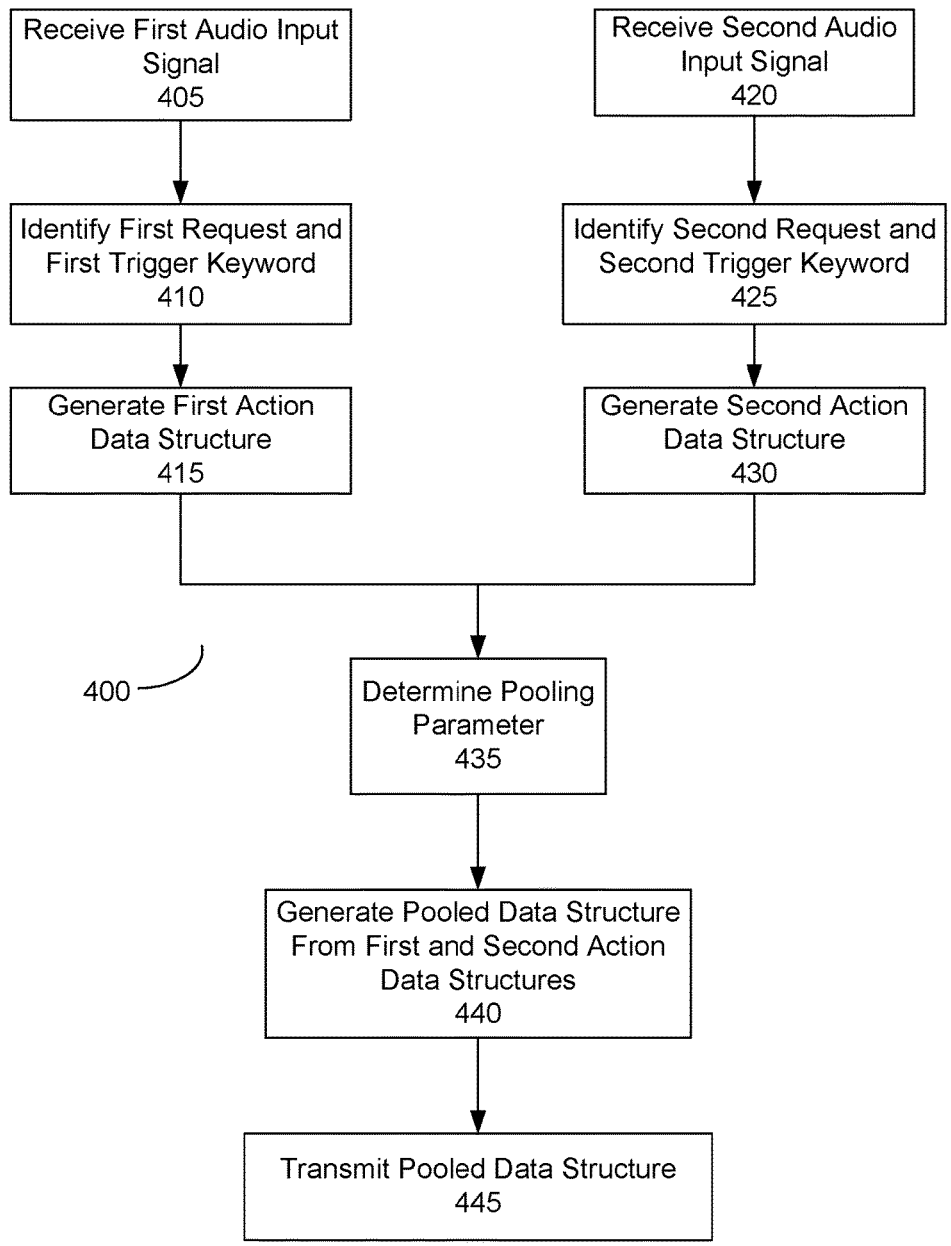
FIG. 4 depicts method to manage voice activated threads in a voice activated data packet based computer network environment.

FIG. 4 depicts method 400 to manage voice activated threads in a voice activated data packet based computer network environment. The method 400 can receive at least one first audio input signal (ACT 405). For example, via the interface 115 the NLP component can receive data packets (ACT 405). The data processing system 105 can execute, launch, or invoke the NLP component 110 to receive packet or other protocol based transmissions via the network from a first client computing device 150. The data packets can include or correspond to an input audio signal detected by the sensor 151 of a first client computing device 150, such as a first end user saying "OK, take me home" into the client computing device 150, e.g., smartphone. The method 400 can parse the input audio signal to identify at least one first request or at least one first trigger keyword from the input audio signal (ACT 410). For example, the NLP component 110 can parse the input audio signal to identify requests (to go "home") as well as trigger keywords ("take") that correspond or relate to the request. The method 400 can generate at least one first action data structure (ACT 415) based on the identified requests or keywords associated with the received first audio input signal. For example, the direct action API 135 can generate an action data structure that includes at least one parameter defining a first action, such as a location for a taxi pick-up, a requested service provider, or time information.

The method 400 can receive at least one second audio input signal (ACT 420). For example, the NLP component 110 can receive packet or other protocol based transmissions via the network from a second client computing device 150. The data packets can include or correspond to an input audio signal detected by the sensor 151 of the second client computing device 150, such as an end user saying "OK, can I get a taxi please" into the second client computing device 150. The method 400 can identify at least one second request or at least one second trigger keyword from the second input audio signal (ACT 425). For example, the NLP component 110 can parse the input audio signal to identify requests (to go "taxi") as well as trigger keywords ("get") that correspond or relate to the request. The method 400 can generate at least one second action data structure (ACT 430) based on the identified requests or keywords associated with the received first audio input signal. For example, the direct action API 135 can generate an action data structure that includes at least one parameter defining a second action, such as a location for a taxi pick-up, a requested service provider, or time information.

The method 400 can determine at least one pooling parameter (ACT 435). For example, based on parameters of respective actions that indicate a common requested service provider or other commonality, (e.g., a level of overlap between action data structures), the pooling component 120 can determine a pooling parameter that indicates the common requested service provider. The method 400 can generate a pooled data structure (ACT 440). For example, based on the indication of the common requested service provider the pooling component 120 can generate at least one pooled data structure that indicates the first and second action data structures, or their associated actions or parameters (ACT 440). The method 400 can transmit the pooled data structure (ACT 445). For example, the data processing system 105 can provide the pooled data structure to one or more service provider computing devices 160 controlled by the common requested service provider entity.

FIG. 5 is a block diagram of an example computer system 500. The computer system or computing device 500 can include or be used to implement the system 100, or its components such as the data processing system 105. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 145. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 145.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 105, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, pooling component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 165).

The relationship of client and server arises by virtue of computer programs running on the respective computers and having a client-server relationship to each other. In some implementations, a server transmits data (e.g., data packets representing a content item) to a client computing device (e.g., for purposes of displaying data to and receiving user input from a user interacting with the client computing device). Data generated at the client computing device (e.g., a result of the user interaction) can be received from the client computing device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the pooling component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, receipt by the data processing system 105 of multiple audio input signals (or identification or respective requests or trigger keywords) can occur simultaneously or in sequence from one or more sources. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to consolidate voice activated threads in a voice activated data packet based computer network environment, comprising:
   a natural language processor component executed by a data processing system to receive, via an interface of the data processing sytem, data packets comprising a first input audio signal detected by a sensor of a first client computing device;
   the natural language processor component to parse the first input audio signal to identify a first request and a first trigger keyword corresponding to the first request;
   a direct action application programming interface ("API") of the data processing system to generate, based on the first trigger keyword and in response to the first request, a first action data structure with a parameter defining a first action;
   the natural language processor component to receive, via the interface of the data processing system, data packets comprising a second input audio signal detected by a sensor of a second client computing device, and to parse the second input audio signal to identify a second request and a second trigger keyword corresponding to the second request;
   the direct action API to generate, based on the second trigger keyword and in response to the second request, a second action data structure with a parameter defining a second action; and
   a pooling component of the data processing system to:
      determine based on a comparison of the first action with the second action a level of overlap between the first action data structure and the second action data structure;
      generate, based on the comparison the level of overlap, the first data structure;

generate, based on the comparison the level of overlap, the first action data structure, and the second action data structure, a pooled data structure that consolidates the first action data structure and the second action data structure; and transmit, via a computer network, the pooled data structure to a service provider computing device to cause the service provider computing device to perform an operation defined by the pooled data structure and corresponding to the first action and the second action.

2. The system of claim 1, comprising the data processing system to:
apply a heuristic technique to the first action data structure and the second action data structure to determine a pooling parameter that indicates the level of overlap between the first action data structure and the second action data structure.

3. The system of claim 1, comprising the data processing system to:
merge the first action data structure with the second action data structure to generate the pooled data structure.

4. the system of claim 1, comprising the data processing system to:
bypass execution of the first action data structure and the second action data structure responsive to generation of the pooled data structure.

5. The system of claim 1, comprising the data processing system to:
perform a plurality of actions via the pooled data structure.

6. The system of claim 1, comprising the data processing system to:
establish a session with the service provider computing device to execute to pooled data structure.

7. The system of claim 1, comprising the data processing system to:
establish a session with the service provider computing device that bypasses the first client computing device and the second client computing device to execute the pooled data structure.

8. The system of claim 1, wherein the data processing system comprises or interfaces with a voice activated assistant.

9. The system of claim 1, comprising the data processing system to:
determine the first action data structure indicates a first account and a first location;
determine the second action data structure indicates a second account different from the first account and the first location; and
generate the pooled data structure responsive to the first location indicated by both the first action data structure and the second action data structure.

10. The system of claim 1, wherein the level of overlap indicates a similarity metric between the first action data structure and the second action data structure.

11. The system of claim 1, wherein the first action includes a first plurality of sub-actions.

12. The system of claim 1, wherein the parameter defining the first action and the parameter defining the second action each indicate location data.

13. The system of claim 1, wherein the parameter defining the first action and the parameter defining the second action each identify common subject matter.

14. A method of consolidating voice activated threads in a voice activated data packet based computer network environment, comprising:
receiving, by a data processing system comprising one or more processors and memory, data packets comprising a first input audio signal detected by a sensor of a first client computing device;
parsing, by the data processing system, the first input audio signal to identify a first request and a first trigger keyword corresponding to the first request;
generating, by the data processing system, based on the first trigger keyword and in response to the first request, a first action data structure with the parameter defining a first action;
receiving, by the data processing system, data packets comprising a second input audio signal detected by a sensor of a second client computing device;
parsing, by the data processing system, the second input audio signal to identify a second request and a second trigger keyword corresponding to the second request;
generating, by the data processing system based on the second trigger keyword and in response to the second request, a second action data structure with a parameter defining a second action;
determining, by the data processing system, based on comparison of the first action with the second action a level of overlap between the first action data structure and the second action data structure;
generating, by the data processing system, based on the comparison and the level of overlap, the first action data structure, and the second action data structure a pooled data structure that consolidates the first action data structure and the second action data structure; and
transmitting, by the data processing system via a computer network, the pooled data structure to a service provider computing device to cause the service provider computing device to perform an operation defined by the pooled data structure and corresponding to the first action and the second action.

15. The method of claim 14, comprising:
determining, via application of a heuristic technique to the first action data structure and the second action data structure, a pooling parameter that indicates the level of overlap between the first action data structure and the second action data structure.

16. The method of claim 14, comprising:
merging the first action data structure with the second action data structure to generate the pooled data structure.

17. The method of claim 14, comprising:
bypassing execution of the first action data structure and the second action data structure responsive to generation of the pooled data structure.

18. The method of claim 14, comprising:
performing a plurality of actions via the pooled data structure.

19. The method of claim 14, comprising:
establishing a session with the service provider computing device to execute the pooled data structure.

20. The method of claim 14, comprising:
establishing a session with the service provider computing device that bypasses the first client computing device and the second client computing device to execute the pooled data structure.

* * * * *